(12) United States Patent
Akiyama et al.

(10) Patent No.: US 7,788,534 B2
(45) Date of Patent: Aug. 31, 2010

(54) METHOD FOR MONITORING AND MANAGING A CLIENT DEVICE IN A DISTRIBUTED AUTONOMIC COMPUTING ENVIRONMENT

(75) Inventors: Kazuhito Akiyama, Tokyo (JP); Yasutaka Nishimura, Kanagawa-ken (JP); Yasuhiro Suzuki, Tokyo (JP); Tadashi Tsumura, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 435 days.

(21) Appl. No.: 11/954,061

(22) Filed: Dec. 11, 2007

(65) Prior Publication Data

US 2009/0150716 A1 Jun. 11, 2009

(51) Int. Cl.
*G06F 11/00* (2006.01)
(52) U.S. Cl. .............................. 714/26; 714/25; 714/27; 714/37; 714/48
(58) Field of Classification Search .................. 714/25, 714/26, 27, 37, 48
See application file for complete search history.

(56) References Cited

U.S. PATENT DOCUMENTS

| | | | | |
|---|---|---|---|---|
| 5,463,768 | A * | 10/1995 | Cuddihy et al. | 714/37 |
| 6,182,249 | B1 * | 1/2001 | Wookey et al. | 714/47 |
| 6,473,659 | B1 * | 10/2002 | Shah et al. | 700/79 |
| 6,487,677 | B1 * | 11/2002 | Jantz et al. | 714/2 |
| 7,137,041 | B2 * | 11/2006 | Kaminsky et al. | 714/47 |
| 7,260,743 | B2 * | 8/2007 | Fellenstein et al. | 714/26 |
| 7,286,962 | B2 * | 10/2007 | Di Palma et al. | 702/182 |
| 7,293,201 | B2 * | 11/2007 | Ansari | 714/38 |
| 7,302,610 | B2 * | 11/2007 | Arend | 714/26 |
| 7,506,241 | B2 * | 3/2009 | Chefalas et al. | 714/819 |
| 7,519,871 | B2 * | 4/2009 | Masser | 714/48 |
| 7,529,974 | B2 * | 5/2009 | Thibaux et al. | 714/26 |
| 7,580,906 | B2 * | 8/2009 | Faihe | 706/14 |
| 7,620,849 | B2 * | 11/2009 | Kato et al. | 714/26 |
| 7,680,753 | B2 * | 3/2010 | Sudhindra et al. | 706/45 |
| 7,689,857 | B2 * | 3/2010 | Lewis | 714/4 |
| 7,689,872 | B2 * | 3/2010 | Doyle et al. | 714/48 |

(Continued)

OTHER PUBLICATIONS

Adrem Netcrunch 4.3 [online]; [retrieved on Dec. 11, 2007]; retrieved from the Internet http://www.adremsoftware.com/netcrunch/index.php.

*Primary Examiner*—Robert Beausoliel
*Assistant Examiner*—Joshua P Lottich
(74) *Attorney, Agent, or Firm*—Cantor Colburn LLP; Christine Smith

(57) ABSTRACT

A stale of a managed client device in a distributed autonomic computing environment is attached to an event occurring on the managed client device. The event is sent, with the attached state of the managed client device, to a server. The state of the managed client device is saved at the server. The event is analyzed for identifying a problem at the client device. An action for solving the problem is generated based on a state of the managed client device at the time the event is analyzed. An execution condition is dynamically generated based on the saved state of the managed client device. The execution condition is added to the action to be executed and sent to the managed client device. At the managed client device, a determination is made whether to execute the action based on the execution condition and a current state of the managed client device.

4 Claims, 2 Drawing Sheets

U.S. PATENT DOCUMENTS

| | | | |
|---|---|---|---|
| 2004/0059704 A1* | 3/2004 | Hellerstein et al. | 707/1 |
| 2004/0059966 A1* | 3/2004 | Chan et al. | 714/48 |
| 2004/0060044 A1* | 3/2004 | Das et al. | 717/171 |
| 2005/0015668 A1* | 1/2005 | Doyle et al. | 714/25 |
| 2005/0086333 A1* | 4/2005 | Chefalas et al. | 709/223 |
| 2005/0086630 A1* | 4/2005 | Chefalas et al. | 717/100 |
| 2005/0132253 A1* | 6/2005 | Gail et al. | 714/25 |
| 2005/0188263 A1* | 8/2005 | Gross et al. | 714/25 |
| 2008/0065577 A1* | 3/2008 | Chefalas et al. | 706/47 |
| 2008/0109683 A1* | 5/2008 | Erwin et al. | 714/46 |
| 2009/0210745 A1* | 8/2009 | Becker et al. | 714/26 |

* cited by examiner

METHOD FOR MONITORING AND MANAGING A CLIENT DEVICE IN A DISTRIBUTED AUTONOMIC COMPUTING ENVIRONMENT

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

This invention relates to monitoring and managing actions in a computing environment, and, in particular, to monitoring and managing a client device in a distributed autonomic computing environment.

Autonomic computing technology has widely come into use. The concept of autonomic monitoring for analyzing an occurred event by knowledge (symptom) and deriving a coping strategy for a problem has been standardized. As for application for a real system, operations of current autonomic monitoring technology cannot cope with various environments and are limited to applications in large-scale systems.

In the current autonomic monitoring process, an occurred event and knowledge (symptom) are put together and analyzed. As such, a server-centralized model is predicated on a substantial intranet or a large-scale Web server, and it cannot be applied to an actual device environment. As information technology systems advance, an autonomic monitoring technique is desired to be applicable to a device, such as an electric home appliance, a cellular phone, etc. A far more flexible technology with wider coverage is needed lo realize an autonomic system on devices under various environments.

SUMMARY

According to an exemplary embodiment, a method is provided for monitoring and managing a client device in a distributed autonomic computing environment. A state of a managed client device in the distributed autonomic environment is monitored, and the state of the managed client device is attached to an event occurring on the managed client device. The event is sent, with the attached state of the managed client device, to a server in the distributed autonomic environment, and the state of the managed client device is saved at the server. The event is analyzed, and a problem occurring at the client device is identified. An action to be performed by the managed client device for solving the problem is generated based on a state of the managed client device at the time the event is analyzed. An execution condition is dynamically generated for the action to be performed by the managed client device based on the saved state of the managed client device. The execution condition is added to the action to be executed, and the execution condition is sent with the action to be performed from the server to the managed client device. At the managed client device, a determination is made whether to execute the action based on the execution condition and a current state of the managed client device.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

The detailed description explains exemplary embodiments, together with advantages and features, by way of example with reference to the drawings.

DETAILED DESCRIPTION

It is practically impossible for a device with small throughput and small storage to perform actions for storing past states, analyzing, identifying and solving a problem only by itself. Therefore, a distributed model for transferring a symptom of the problem or an analysis to another node needs to be adopted.

When monitoring and management is performed in the distributed model, a time lag always occurs until the event is analyzed and the action is identified. It is impossible to perform the action immediately after the problem occurs. If a state changes when the time lag occurs, and the action is received by the device, that action may be unneeded or change of behavior of the action may be required. Therefore, a technique for detecting an unneeded action and deciding whether the action can be performed or not according to the state of the device is needed. The problem is outstanding particularly in an environment in which a device communicates at regular intervals with the device being disconnected at the time of no communication.

According to an exemplary embodiment, a method and a system are provided for monitoring a managing a client device in a distributed autonomic environment. This enables validation of whether a program (action) for solving a problem sent from a managed client device can be performed or not in a distributed autonomic environment, to which an autonomic system with various autonomic monitoring processes implemented is connected and which needs no integrated large-scale server.

Figure 1:
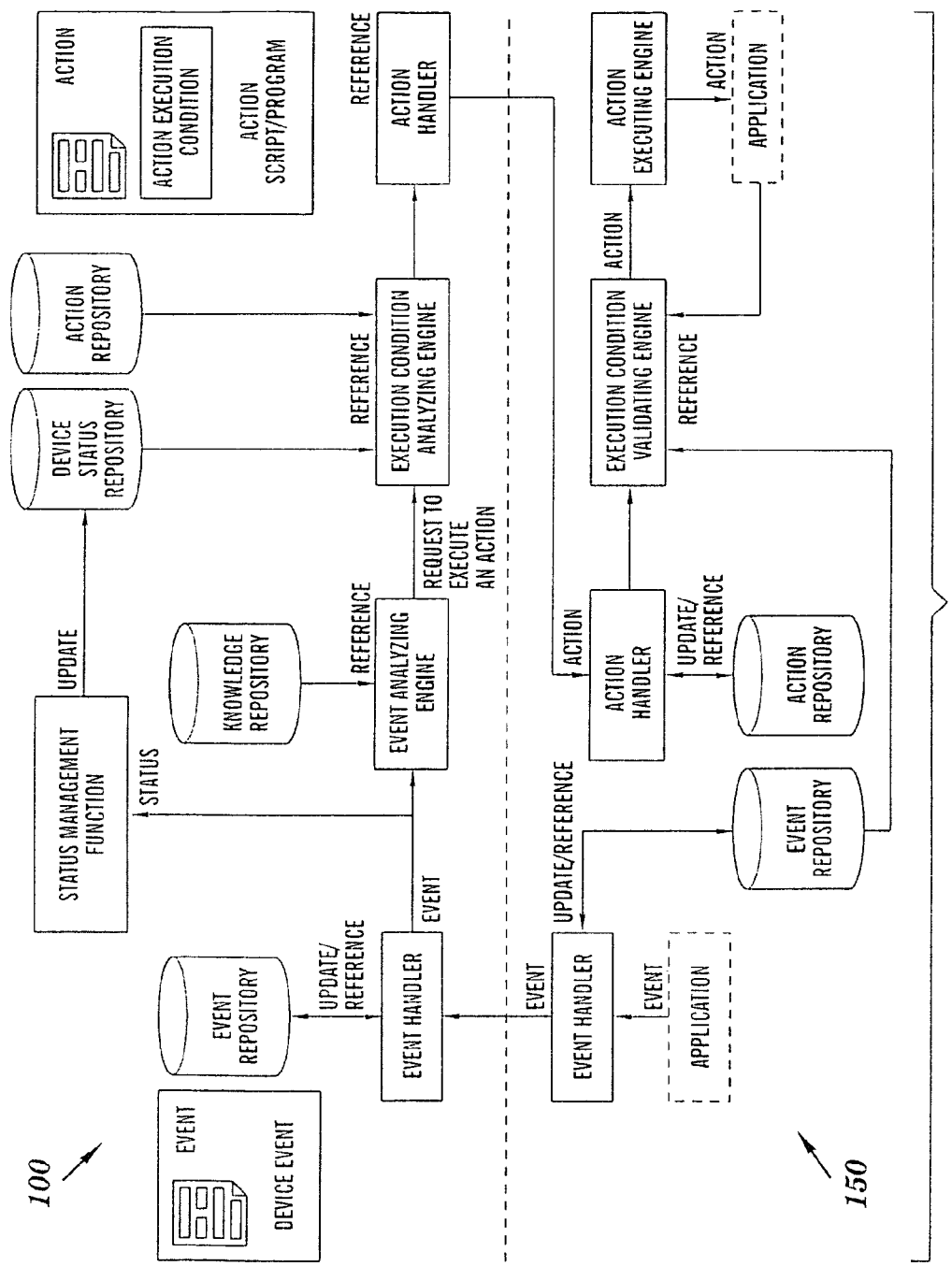
FIG. 1 illustrates a system for monitoring and managing a client device in a distributed autonomic computing environment according to an exemplary embodiment.

FIG. 1 illustrates a system for monitoring and managing a client device in a distributed autonomic computing environment FIG. 1 depicts a server side 100 and a client side 150. The client side includes a device monitored and managed by the server side 150. A state history of the client device is monitored, and the state of managed client device is attached to an event occurring on the client device. The event, with the attached state of the client device, is sent from an event handler on the client side 150 to an event handler on the server side 150. The server side maintains a state history of the device, including a general-purpose value, such as a CPU usage, a parameter unique to the device, and set item, etc. This state history may be received from a status management function in the server side and saved in a state repository at the server side.

The event is analyzed, and a problem occurring at the client device is determined by an event analyzing engine in the server side. An action to be performed by the managed client device for solving the problem is dynamically generated by an execution condition analyzing engine based on a state of the managed client device at the time the event is analyzed. The action, including the execution condition and action/ program script for the action to be performed is sent from an action handler in the server side 100 to an action handler in the client side 150.

Whether the action can be executed or not is determined by referencing the stale inside the device and the execution condition on the device based on the action sent from the server side. A determination is made, by an execution condition validation engine at the client side 150, whether to execute the action based on the execution condition and a current state of the managed client device. A difference between the state of the client device when the event that occurred on the client device was analyzed on the server side and the current state of the client device, detected after the event that previously occurred was sent to the server side, can be detected based on the dynamically generated execution condition. Thus, a determination may be made whether the action for solving a problem on the client device is still needed, based on the change in state of the client device. As noted above, this determination may be made by the execution validation engine at the client side 150. The execution validation engine may determine to execute the action, execute an alternative action, re-execute an action, stop execution of an action, or notify the server side of an event based on the execution condition and the current state of the managed client device. The results of this determination are sent to an action executing engine in the client side 150, which causes the action suggested by the execution validation engine to be performed.

Figure 2:
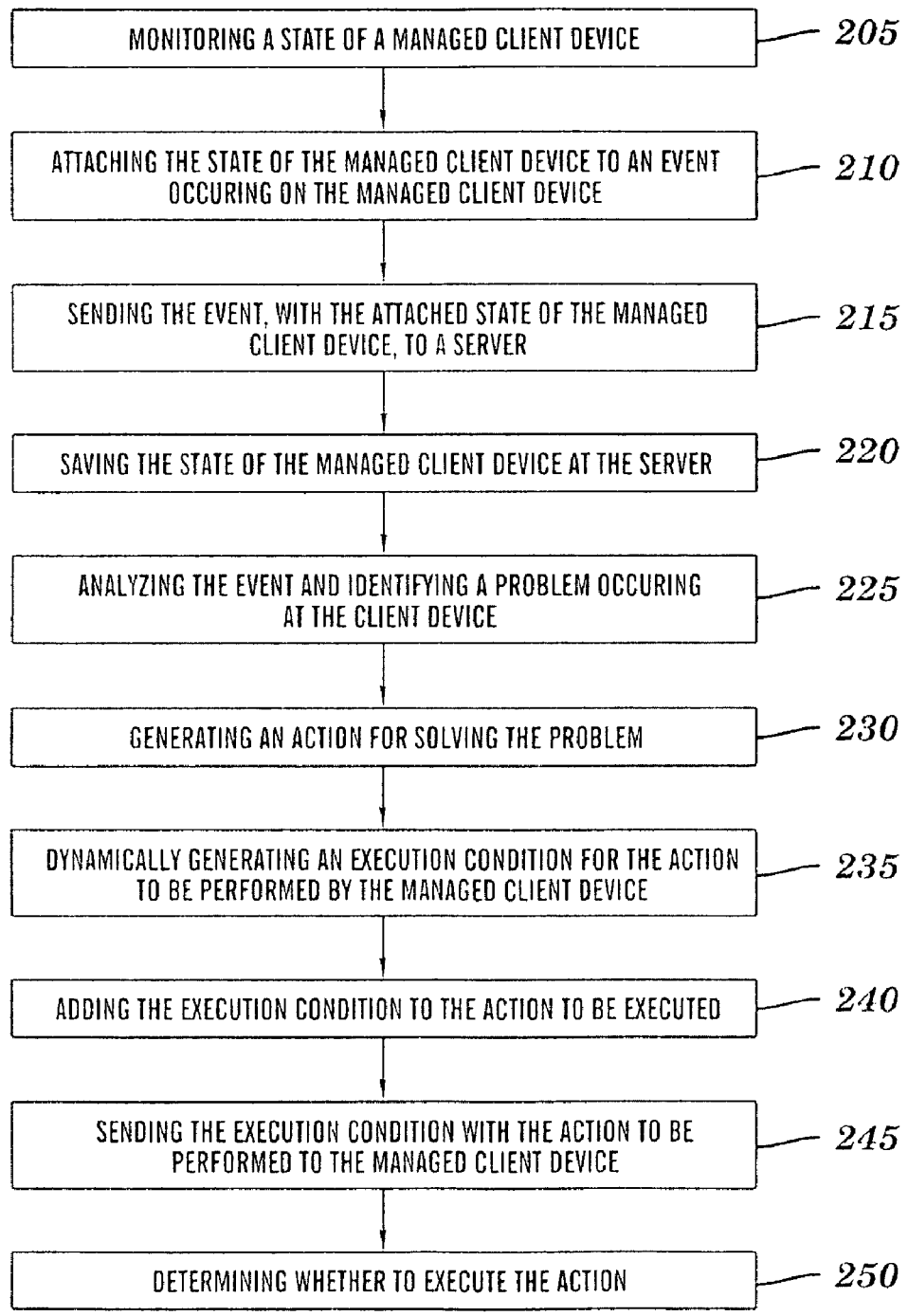
FIG. 2 illustrates a method for monitoring and managing a client device in a distributed autonomic computing environment according to an exemplary embodiment.

FIG. 2 illustrates a method for monitoring and managing a client device in a distributed autonomic computing environment. The method begins at step 205 at which a state of a managed client device in the distributed autonomic environment is monitored. At step 210, the stale of the managed client device is attached to an event occurring on the managed client device. At step 215, the event, with the attached state of the managed client device, is sent to a server in the distributed autonomic environment. The stale of the managed client device is saved at the server at step 220. The event is analyzed, and a problem occurring at the client device is determined at step 225. At step 230, an action to be performed by the managed client device for solving the problem is generated based on a state of the managed client device at the time the event is analyzed. At step 235, an execution condition for the action to be performed by the managed client device is dynamically generated based on the saved stale of (he managed client device. At step 240, the execution condition is added to the action to be executed. At step 245, the execution condition is sent with the action to be performed from the server to the managed client device. At step 250, a determination is made, at the managed client device, whether to execute the action based on the execution condition and a current state of the managed client device.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While exemplary embodiments have been described, it will be understood that those skilled in the art, both now and in the future, may make various improvements and enhancements which fall within the scope of the claims which follow. These claims should be construed to maintain the proper protection for the invention first described.

What is claimed is:

1. A method for monitoring and managing a client device in a distributed autonomic computing environment, comprising:
   monitoring a state of a managed client device in the distributed autonomic computing environment;
   attaching the state of the managed client device to an event occurring on the managed client device;
   sending the event, with the attached state of the managed client device, to a server in the distributed autonomic computing environment;
   saving the state of the managed client device at the server;
   analyzing the event and identifying a problem occurring at the client device;
   generating an action to be performed by the managed client device for solving the problem, wherein the action is generated based on a state of the managed client device at the time the event is analyzed;
   dynamically generating an execution condition for the action to be performed by the managed client device based on the saved state of the managed client device;
   adding the execution condition to the action to be executed;
   sending the execution condition with the action to be performed from the server to the managed client device; and
   determining, at the managed client device, whether to execute the action based on the execution condition and a current slate of the managed client device.

2. The method of claim 1, wherein the step of determining includes:
   detecting a difference between the state of the managed client device at the time the server analyzes the event and the current state of the managed client device based on the execution condition; and
   determining whether the action is needed based on the detected difference.

3. The method of claim 1, wherein the step of determining includes deciding to execute the action, execute an alternative action, re-execute an action, stop execution of an action, or notify the server of an event based on the execution condition and the current state of the managed client device.

4. The method of claim 1, wherein the state of the managed client device includes at least one of CPU usage, a parameter unique to the managed client device, and a set item.

* * * * *